US012593073B2

(12) United States Patent
Yang et al.

(10) Patent No.: US 12,593,073 B2
(45) Date of Patent: Mar. 31, 2026

(54) POINT CLOUD ENCODING AND DECODING METHOD AND DEVICE BASED ON TWO-DIMENSIONAL REGULARIZATION PLANE PROJECTION

(71) Applicant: Honor Device Co., Ltd., Shenzhen (CN)

(72) Inventors: Fuzheng Yang, Shenzhen (CN); Wei Zhang, Shenzhen (CN); Yuxin Du, Shenzhen (CN); Zexing Sun, Shenzhen (CN); Youguang Yu, Shenzhen (CN); Tian Chen, Shenzhen (CN); Ke Zhang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 351 days.

(21) Appl. No.: 18/268,466

(22) PCT Filed: Feb. 7, 2022

(86) PCT No.: PCT/CN2022/075407
§ 371 (c)(1),
(2) Date: Jun. 20, 2023

(87) PCT Pub. No.: WO2022/166966
PCT Pub. Date: Aug. 11, 2022

(65) Prior Publication Data
US 2024/0080497 A1      Mar. 7, 2024

(30) Foreign Application Priority Data
Feb. 8, 2021    (CN) .......................... 202110172789.9

(51) Int. Cl.
H04N 19/85 (2014.01)
H04N 19/597 (2014.01)
H04N 19/70 (2014.01)

(52) U.S. Cl.
CPC ........... H04N 19/85 (2014.11); H04N 19/597 (2014.11); H04N 19/70 (2014.11)

(58) Field of Classification Search
USPC ....................................................... 382/233
See application file for complete search history.

(56) References Cited

U.S. PATENT DOCUMENTS

| | | | |
|---|---|---|---|
| 11,361,472 B2 | 6/2022 | Lasserre et al. | |
| 11,405,644 B2 | 8/2022 | Nakagami et al. | |

(Continued)

FOREIGN PATENT DOCUMENTS

| | | | | |
|---|---|---|---|---|
| CN | 110708529 A | * | 1/2020 | ............. H04N 19/85 |
| CN | 110708529 B | | 8/2020 | |

(Continued)

*Primary Examiner* — Jacky X Zheng
(74) *Attorney, Agent, or Firm* — Leydig, Voit & Mayer, Ltd.

(57) ABSTRACT

Disclosed are a point cloud encoding and decoding method and device based on a two-dimensional regularization plane projection. The encoding method includes: acquiring original point cloud data; performing two-dimensional regularization plane projection on the original point cloud data to obtain a two-dimensional projection plane structure; obtaining a plurality of pieces of two-dimensional image information according to the two-dimensional projection plane structure; and encoding the plurality of pieces of two-dimensional image information to obtain code stream information.

6 Claims, 5 Drawing Sheets

(56)  References Cited

U.S. PATENT DOCUMENTS

| 2019/0156520 | A1 |  | 5/2019 | Mammou et al. |
| 2020/0107033 | A1 |  | 4/2020 | Joshi et al. |
| 2020/0296401 | A1 |  | 9/2020 | Lee et al. |
| 2020/0302632 | A1 |  | 9/2020 | Oh |
| 2023/0290007 | A1 | * | 9/2023 | Yang .................... H04N 19/597 |
| 2023/0396800 | A1 | * | 12/2023 | Yang .................... H04N 19/129 |
| 2024/0119636 | A1 | * | 4/2024 | Yang ....................... G06T 9/001 |

FOREIGN PATENT DOCUMENTS

| CN | 111739111 | A | 10/2020 |
| CN | 112153391 | A | 12/2020 |
| WO | 2020010444 | A1 | 1/2020 |
| WO | 2020026846 | A1 | 2/2020 |
| WO | 2020187140 | A1 | 9/2020 |

* cited by examiner

POINT CLOUD ENCODING AND DECODING METHOD AND DEVICE BASED ON TWO-DIMENSIONAL REGULARIZATION PLANE PROJECTION

CROSS-REFERENCE TO RELATED APPLICATIONS

This application is a national stage of International Application No. PCT/CN2022/075407, filed on Feb. 7, 2022, which claims priority to Chinese Patent Application No. 202110172789.9, filed on Feb. 8, 2021, both of which are hereby incorporated by reference in their entireties.

TECHNICAL FIELD

The present disclosure relates to technical field of encoding and decoding, and specifically, to a point cloud encoding and decoding method and device based on a two-dimensional regularization plane projection.

BACKGROUND

With the improvement of hardware processing capabilities and the rapid development of computer vision, the three-dimensional point cloud has become a new generation of immersive multimedia after audio, image, and video, and is widely applied to virtual reality, augmented reality, automated driving, environmental modeling, and the like. However, the three-dimensional point cloud usually has a relatively large amount of data, which is not conducive to the transmission and storage of point cloud data. Therefore, it is of great significance to study an efficient point cloud encoding and decoding technology.

In the existing geometry-based point cloud compression (G-PCC) encoding framework, the geometry information and attribute information of the point cloud are encoded separately. At present, the G-PCC geometric encoding and decoding may be divided into octree-based geometric encoding and decoding and prediction tree-based geometric encoding and decoding.

Octree-based geometric encoding and decoding: At an encoder side, firstly, the geometry information of the point cloud is preprocessed, which includes the coordinate conversion and voxelization process of the point cloud. Subsequently, tree division (octree/quadtree/binary tree) is continuously performed on a bounding box in which the point cloud is located in the order of breadth-first traversal. Finally, the placeholder code of each node is encoded, and the quantity of points included in each leaf node is encoded, to generate a binary code stream. At a decoder side, firstly, the placeholder code of each node is continuously obtained by parsing in the order of breadth-first traversal. Subsequently, tree division is continuously performed in sequence, and the division stops until a unit cube of 1×1×1 is obtained through division. Finally, the quantity of points included in each leaf node is obtained by parsing, and finally reconstructed point cloud geometry information is obtained.

Prediction tree-based geometric encoding and decoding: At the encoder side, firstly, an original point cloud is sorted. Subsequently, a prediction tree structure is established. By classifying each point to a laser scanner to which the point belongs, the prediction tree structure is established according to different laser scanners. Subsequently, each node in the prediction tree is traversed, geometry information of the nodes is predicted by selecting different prediction modes to obtain predicted residuals, the predicted residuals are quantized by using a quantization parameter. Finally, the prediction tree structure, the quantization parameter, the predicted residuals of the geometry information of the nodes, and the like are encoded to generate a binary code stream. At the decoder side, firstly, the code stream is analyzed; then the prediction tree structure is reconstructed; subsequently the predicted residuals are dequantized based on the predicted residual of the geometry information of each node obtained by parsing and the quantization parameter; and finally reconstructed geometry information of each node is restored. That is, reconstruction of point cloud geometry information is completed.

However, due to relatively strong spatial sparsity of the point cloud, for the point cloud encoding technology using an octree structure, this structure will lead to a relatively large proportion of empty nodes obtained by division, and the spatial correlation of the point cloud cannot be fully reflected, which is not conducive to point cloud prediction and entropy encoding. In the prediction tree-based point cloud encoding and decoding technology, some parameters of the lidar device are used to establish a tree structure, and the tree structure is used for predictive encoding based on this. However, the tree structure does not fully reflect the spatial correlation of the point cloud, which is not conducive to point cloud prediction and entropy encoding. Therefore, both of the foregoing two point cloud encoding and decoding technologies have the problem of insufficiently high encoding efficiency.

SUMMARY

To resolve the foregoing problem in the existing technologies, the present disclosure provides a point cloud encoding and decoding method and device based on a two-dimensional regularization plane projection. The technical problem to be resolved in the present disclosure is implemented by the following technical solutions:

A point cloud encoding method based on a two-dimensional regularization plane projection is provided, including:

acquiring original point cloud data;

performing two-dimensional regularization plane projection on the original point cloud data to obtain a two-dimensional projection plane structure;

obtaining a plurality of pieces of two-dimensional image information according to the two-dimensional projection plane structure; and encoding the plurality of pieces of two-dimensional image information to obtain code stream information.

In an embodiment of the present disclosure, the plurality of pieces of two-dimensional image information include a placeholder information map.

In an embodiment of the present disclosure, the encoding the plurality of pieces of two-dimensional image information to obtain code stream information includes:

encoding the placeholder information map to obtain a placeholder information code stream.

In an embodiment of the present disclosure, the encoding the placeholder information map to obtain a placeholder information code stream includes:

identifying an empty row and an empty column in the placeholder information map;

encoding identifiers of the empty row and the empty column in the placeholder information map; and encoding placeholder information of pixels in a non-empty row and a non-empty column in the placeholder information map to obtain the placeholder information code stream.

In an embodiment of the present disclosure, the encoding placeholder information of pixels in a non-empty row and a non-empty column in the placeholder information map includes:

predicting the placeholder information of the pixels in the non-empty row and the non-empty column by using reconstructed placeholder information of encoded pixels, and performing corresponding encoding.

In an embodiment of the present disclosure, the plurality of pieces of two-dimensional image information further include at least one of a depth information map, a projection residual information map, and a coordinate conversion error information map.

Another embodiment of the present disclosure further provides a point cloud encoding device based on a two-dimensional regularization plane projection, including:

a first data acquisition module, configured to acquire original point cloud data;

a projection module, configured to perform two-dimensional regularization plane projection on the original point cloud data to obtain a two-dimensional projection plane structure;

a data processing module, configured to obtain a plurality of pieces of two-dimensional image information according to the two-dimensional projection plane structure; and an encoding module, configured to encode the plurality of pieces of two-dimensional image information to obtain code stream information.

Still another embodiment of the present disclosure further provides a point cloud decoding method based on a two-dimensional regularization plane projection, including:

acquiring code stream information and decoding the code stream information to obtain parsed data;

reconstructing a plurality of pieces of two-dimensional image information according to the parsed data;

obtaining a two-dimensional projection plane structure according to the plurality of pieces of two-dimensional image information; and reconstructing a point cloud by using the two-dimensional projection plane structure.

In an embodiment of the present disclosure, the reconstructing a plurality of pieces of two-dimensional image information according to the parsed data includes:

directly reconstructing pixels in an empty row or empty column in a placeholder information map according to identifiers of the empty row and the empty column in the placeholder information map in the parsed data, and reconstructing pixels in a non-empty row and a non-empty column in the placeholder information map according to predicted residuals of placeholder information in the parsed data, to obtain a reconstructed placeholder information map.

Still another embodiment of the present disclosure further provides a point cloud decoding device based on a two-dimensional regularization plane projection, including:

a second data acquisition module, configured to acquire code stream information and decode the code stream information to obtain parsed data;

a first reconstruction module, configured to reconstruct a plurality of pieces of two-dimensional image information according to the parsed data;

a second reconstruction module, configured to obtain a two-dimensional projection plane structure according to the plurality of pieces of two-dimensional image information; and a point cloud reconstruction module, configured to reconstruct a point cloud by using the two-dimensional projection plane structure.

Beneficial effects of the present disclosure are as follows:

1. According to the present disclosure, a point cloud in a three-dimensional space is projected to a corresponding two-dimensional regularization projection plane structure, and regularization correction is performed on the point cloud in a vertical direction and a horizontal direction, to obtain a strong correlation representation of the point cloud on the two-dimensional projection plane structure, so that sparsity in a three-dimensional representation structure is avoided, and the spatial correlation of the point cloud is better reflected; and when a plurality of pieces of two-dimensional image information obtained for the two-dimensional regularization projection plane structure are encoded subsequently, the spatial correlation of the point cloud can be greatly utilized, and the spatial redundancy is reduced, thereby further improving the encoding efficiency of the point cloud.

2. According to the present disclosure, when a placeholder information map obtained through two-dimensional regularization plane projection is encoded, the empty row and empty column elements are not encoded, thereby greatly improving the encoding efficiency.

3. According to the present disclosure, a placeholder information map may be used for assisting in encoding other two-dimensional maps, to improve the encoding efficiency.

The following further describes the present disclosure in detail with reference to the accompanying drawings and the embodiments.

DESCRIPTION OF EMBODIMENTS

The present disclosure is further described in detail below with reference to specific embodiments, but the implementations of the present disclosure are not limited thereto.

Embodiment 1

Figure 1:
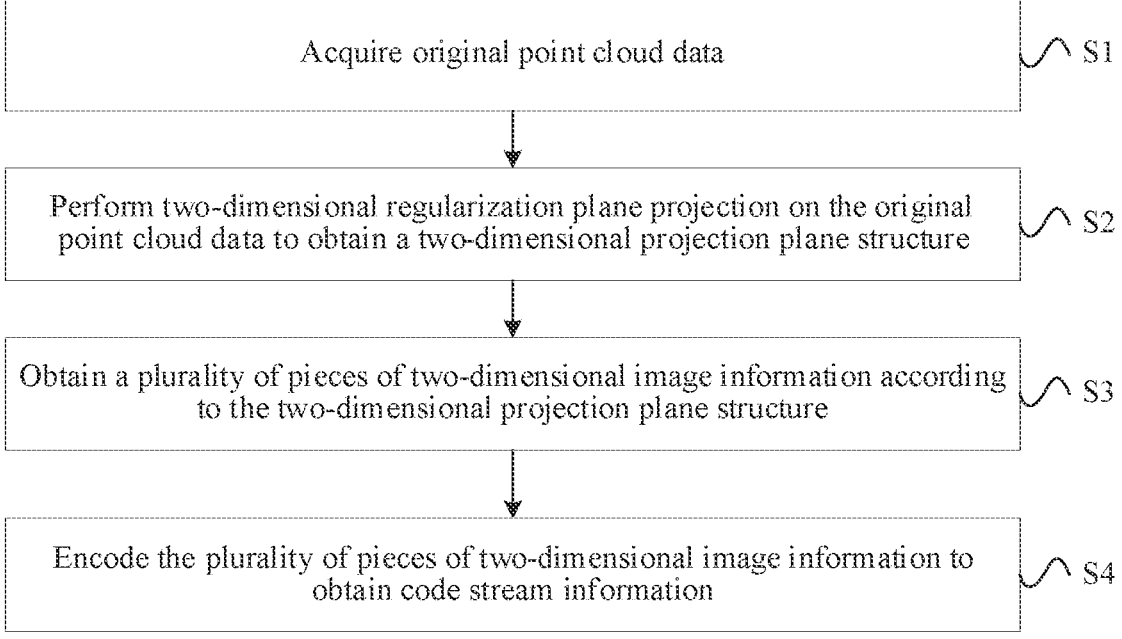
FIG. 1 is a schematic diagram of a point cloud encoding method based on a two-dimensional regularization plane projection according to an embodiment of the present disclosure.

FIG. 1 is a schematic diagram of a point cloud encoding method based on a two-dimensional regularization plane projection according to an embodiment of the present disclosure, which specifically includes:

S1: Acquire original point cloud data.

Specifically, the original point cloud data usually includes a group of three-dimensional space points, and each space point records its geometric position information and additional attribute information such as color, reflectivity, and normal. The geometric position information of the point cloud is generally expressed based on a Cartesian coordinate system, that is, expressed by using the coordinates x, y, and z of points. The original point cloud data may be acquired through 3D scanning devices such as a lidar, and may alternatively be acquired based on public datasets provided by various platforms. In this embodiment, it is assumed that the geometric position information of the acquired original point cloud data is expressed based on the Cartesian coordinate system. It should be noted that the representation method of the geometric position information of the original point cloud data is not limited to Cartesian coordinates.

S2: Perform two-dimensional regularization plane projection on the original point cloud data to obtain a two-dimensional projection plane structure.

Specifically, in this embodiment, before two-dimensional regularization plane projection is performed on the original point cloud, preprocessing such as voxelization processing may further be performed on the original point cloud data, to facilitate subsequent encoding.

First, the two-dimensional projection plane structure is initialized.

Initialization of the two-dimensional regularization projection plane structure of the point cloud requires the use of regularization parameters. The regularization parameters are usually finely measured by the manufacturer and provided to consumers as one of the necessary data, such as an acquisition range of a lidar, a sampling angular resolution $\Delta\varphi$ or the quantity of sampling points of the horizontal azimuth angle, a distance correction factor of each laser scanner, offset information $V_o$ and $H_o$ of the laser scanner in the vertical direction and the horizontal direction, and offset information $\theta_0$ and $\alpha$ of the laser scanner along the pitch angle and the horizontal azimuth angle.

It should be noted that the regularization parameters are not limited to the parameters given above. Given calibration parameters of the lidar may be used as the regularization parameters, or the regularization parameters may be obtained in manners such as optimizing estimation and data fitting in a case that the calibration parameters of the lidar are not given.

The two-dimensional regularization projection plane structure of the point cloud is a data structure including M rows and N columns of pixels, and points in the three-dimensional point cloud correspond to the pixels in the data structure after projection. In addition, a pixel (i, j) in the data structure may be associated with a cylindrical coordinate component ($\theta$, $\phi$). For example, the pixel (i, j) corresponding to a cylindrical coordinate (r, $\theta$, $\phi$) may be found by using the following formulas:

$$i = \min_{1,2\ldots LaserNum} |\theta - \theta_0|;$$

$$j = (\phi + 180°)/\Delta\varphi.$$

Figure 2:
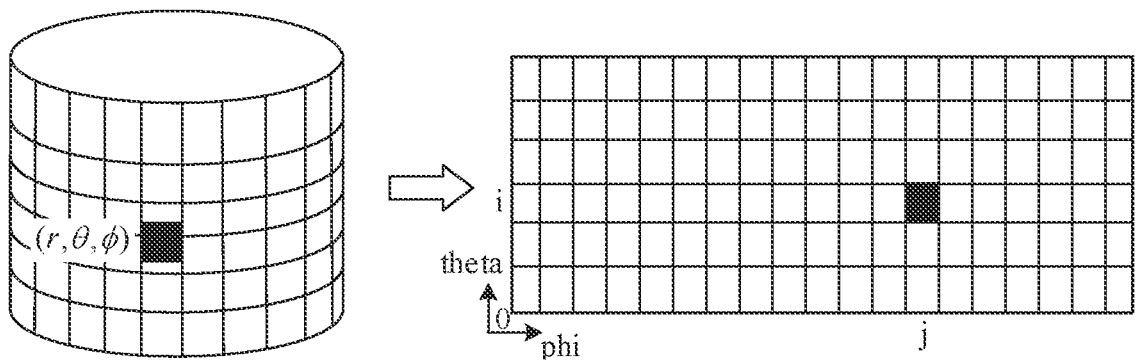
FIG. 2 is a schematic diagram of a correspondence between cylindrical coordinates of points and pixels in a two-dimensional projection plane according to an embodiment of the present disclosure.

Specifically, FIG. 2 is a schematic diagram of a correspondence between cylindrical coordinates of points and pixels in a two-dimensional projection plane according to an embodiment of the present disclosure.

It should be noted that the correspondence of pixels herein is not limited to cylindrical coordinates.

Further, the resolution of the two-dimensional regularization projection plane may be obtained by using the regularization parameters. For example, it is assumed that the resolution of the two-dimensional regularization projection plane is M×N, then the quantity of laser scanners in the regularization parameters may be used to initialize M, and the sampling angle resolution $\Delta\phi$ of the horizontal azimuth angle (or the quantity of sampling points of the laser scanner) is used to initialize N. For example, the following formula may be used, and finally the initialization of the two-dimensional projection plane structure can be completed, to obtain a plane structure including M×N pixels:

$$M = laserNum;$$

$$N = \frac{360°}{\Delta\varphi} \text{ or } N = pointNumPerLaser.$$

In addition, a mapping relationship between the original point cloud data and the two-dimensional projection plane structure is determined, so as to project the original point cloud data onto the two-dimensional projection plane structure.

In this part, by determining the position of the original point cloud in the two-dimensional projection plane structure point by point, and the point cloud originally distributed disorderly in the Cartesian coordinate system is mapped onto the evenly distributed two-dimensional regularization projection plane structure. Specifically, for each point in the original point cloud, a corresponding pixel is determined in the two-dimensional projection plane structure. For example, a pixel with the shortest spatial distance from a projection position of the point in the two-dimensional plane may be selected as the corresponding pixel of the point.

If a cylindrical coordinate system is used for two-dimensional projection, the specific process of determining pixels corresponding to the original point cloud is as follows:

a. A cylindrical coordinate component r of a current point in the original point cloud data is determined, and specifically, the following formula is used for calculation:

$$r = \sqrt{x^2 + y^2}.$$

b. A search region of the current point in the two-dimensional projection plane structure is determined. Specifically, the entire two-dimensional projection plane structure may be directly selected as the search region. Further, to reduce the amount of calculation, the pitch angle $\theta$ and azimuth angle $\phi$ of the cylindrical coordinate component of the current point may further be used to determine the search region of the corresponding pixel in the two-dimensional projection plane structure, to reduce the search region.

c. After the search region is determined, for each pixel (i, j) in the search region, the regularization parameters, that is, the calibration parameters $\theta_0$, $V_o$, $H_o$, and $\alpha$ of the i$^{th}$ laser scanner of the lidar, are used to calculate the position (xl, yl, zl) of the current pixel in the Cartesian coordinate system, where the specific calculation formula is as follows:

$$\theta_i = \theta_0$$

$$\phi_j = -180° + j \times \Delta\phi$$

$$xl = r \cdot \sin(\phi_j - \alpha) - H_o \cdot \cos(\phi_j - \alpha)$$

$$yl = r \cdot \cos(\phi_j - \alpha) + H_o \cdot \sin(\phi_j - \alpha)$$

$$zl = r \cdot \tan\theta_i + V_o$$

d. After the position (xl, yl, zl) of the current pixel in the Cartesian coordinate system is obtained, a spatial distance between the position and the current point (x, y, z) is calculated and used as an error Err, that is:

$$Err = dist\{(x,y,z),(xl,yl,zl)\}$$

If the error Err is less than a current minimum error minErr, the error Err is used to update the minimum error minErr, and i and j corresponding to the current pixel are used to update i and j of the pixel corresponding to the current point; and if the error Err is greater than the minimum error minErr, the foregoing update process will not be performed.

e. After all the pixels in the search region have been traversed, the corresponding pixel (i, j) of the current point in the two-dimensional projection plane structure can be determined.

Figure 3:
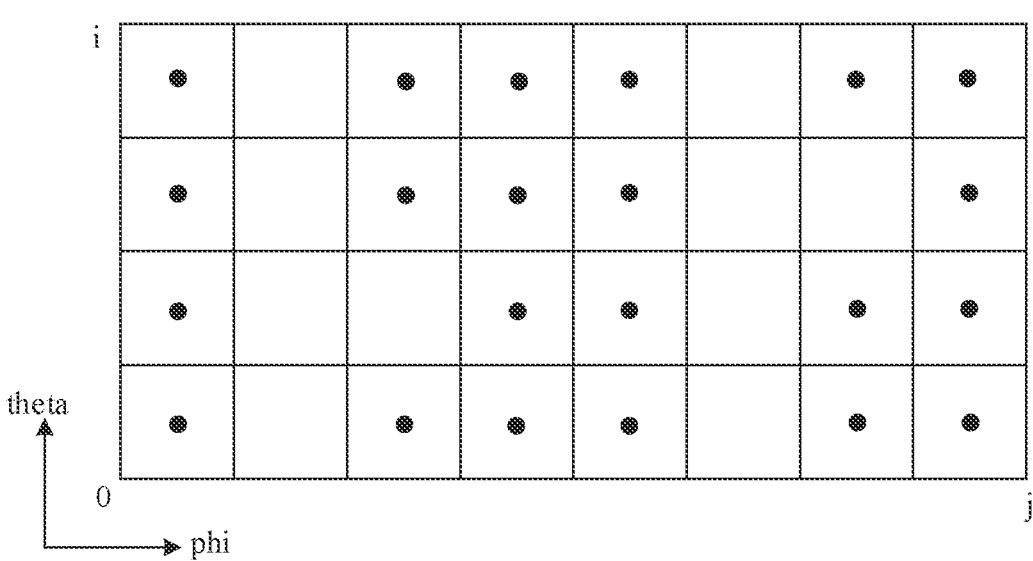
FIG. 3 is a schematic diagram of a two-dimensional projection plane structure of a point cloud according to an embodiment of the present disclosure.

When the foregoing operations have been completed for all the points in the original point cloud, the two-dimensional regularization plane projection of the point cloud is completed. Specifically, FIG. 3 is a schematic diagram of a two-dimensional projection plane structure of a point cloud according to an embodiment of the present disclosure. Each point in the original point cloud data is mapped to a corresponding pixel in the structure.

It should be noted that during the two-dimensional regularization plane projection of the point cloud, a plurality of points in the point cloud may correspond to the same pixel in the two-dimensional projection plane structure. To avoid this situation, these space points may be chosen to be projected to different pixels during projection. For example, during projection of a certain point, if the pixel corresponding to the point already has a corresponding point, the point is projected to an empty pixel adjacent to the pixel. In addition, if a plurality of points in the point cloud have been projected to the same pixel in the two-dimensional projection plane structure, during encoding based on the two-dimensional projection plane structure, the quantity of corresponding points in each pixel should be additionally encoded, and information of each corresponding point in the pixel is encoded according to the quantity of points.

S3: Obtain a plurality of pieces of two-dimensional image information according to the two-dimensional projection plane structure.

In this embodiment, the plurality of pieces of two-dimensional image information include a placeholder information map.

Specifically, the placeholder information map is used to identify whether each pixel in the two-dimensional regularization projection plane structure is occupied, that is, whether each pixel corresponds to a point in the point cloud. If each pixel is occupied, the pixel is referred to as being non-empty; otherwise, the pixel is referred to as being empty. For example, 0 and 1 may be used for representation, where 1 indicates that the current pixel is occupied; and 0 indicates that the current pixel is not occupied. In this way, the placeholder information map of the point cloud may be obtained according to the two-dimensional projection plane structure of the point cloud.

S4: Encode the plurality of pieces of two-dimensional image information to obtain code stream information.

Correspondingly, the encoding the plurality of pieces of two-dimensional image information to obtain code stream information includes: encoding the placeholder information map to obtain a placeholder information code stream.

Figure 4:
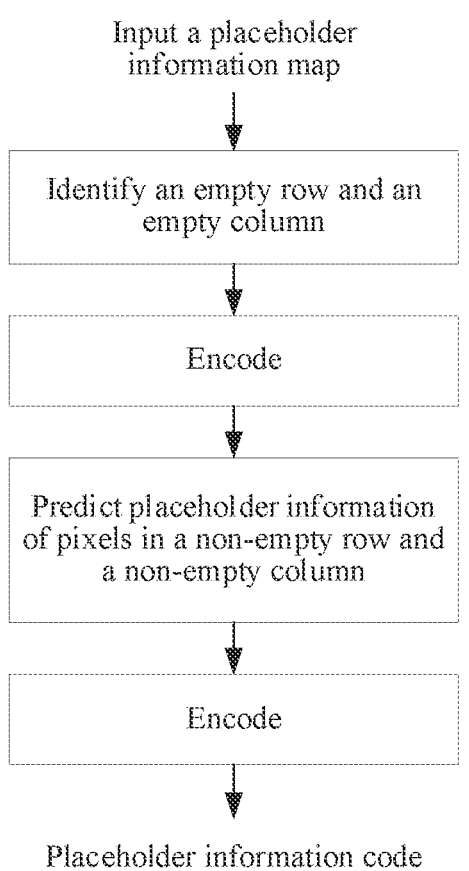
FIG. 4 is an encoding block diagram of a placeholder information map according to an embodiment of the present disclosure.

FIG. 4 is an encoding block diagram of a placeholder information map according to an embodiment of the present disclosure, which specifically includes:

41) Identify an empty row and an empty column in the placeholder information map.

Because there may be an entire row or an entire column of pixels that are not occupied, that is, there is an empty row or empty column, in an inputted placeholder information map, the empty row or empty column in the placeholder information map needs to be identified, thereby performing encoding more efficiently.

Specifically, each row of pixels in the placeholder information map is scanned in a certain order. If the current pixel is non-empty, the row is non-empty. Subsequently, the column number of the non-empty pixel is recorded, then the column corresponding to the column number is also non-empty. Subsequently, the next row is directly scanned; and if the current pixel is empty and the current pixel is the last pixel of the row, the row is empty, and then the empty row is identified. Subsequently, each column in the placeholder information map is scanned in a certain order, and the non-empty column that has been recorded before is jumped. If the current pixel is non-empty, the column is non-empty, and then the next column is directly scanned. If the current pixel is empty and the current pixel is the last pixel of the column, the column is empty, and then the empty column is identified. Specifically, row numbers and column numbers may be used to identify empty rows and empty columns.

42) Encode identifiers of the empty row and the empty column in the placeholder information map.

Specifically, existing encoding technologies such as direct encoding or differential predictive encoding may be used to encode the identifiers of empty rows and empty columns.

43) Encode placeholder information of pixels in a non-empty row and a non-empty column in the placeholder information map.

In this embodiment, the placeholder information of the pixels in the non-empty row and the non-empty column may be predicted by using reconstructed placeholder information of encoded pixels, and corresponding encoding is performed.

Specifically, each pixel in the placeholder information map is scanned in a certain order, for example, Z-shaped scanning, and whether the current pixel is in an empty row or empty column of the placeholder information map is determined. Subsequently, for the current pixel in a non-empty row and a non-empty column, reconstructed placeholder information of the encoded and decoded pixels is used to predict the placeholder information of the current pixel.

Figure 5:
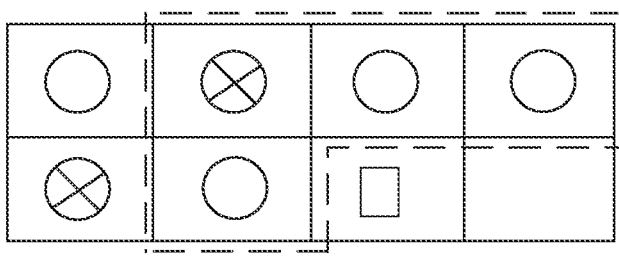
FIG. 5 is a schematic diagram of prediction on placeholder information of a current pixel by using a neighbor pixel according to an embodiment of the present disclosure.

More specifically, for example, reconstructed placeholder information of encoded and decoded neighbor pixels adjacent to the current pixel may be used for prediction. FIG. 5 is a schematic diagram of prediction on placeholder information of a current pixel by using a neighbor pixel according to an embodiment of the present disclosure, where ☆ represents the pixel currently to be encoded, ◯ represents an encoded and decoded occupied pixel, and ⊗ represents an encoded and decoded unoccupied pixel. The pixels included in the dashed box in FIG. 5 are the encoded and decoded neighbor pixels adjacent to the current pixel. Subsequently, the obtained predicted residual information may be encoded by using the existing context-based entropy encoding technology, to obtain a placeholder information code stream. In addition, if there is no encoded pixel available for the current pixel, the placeholder information of the current pixel is directly encoded.

Figure 6:
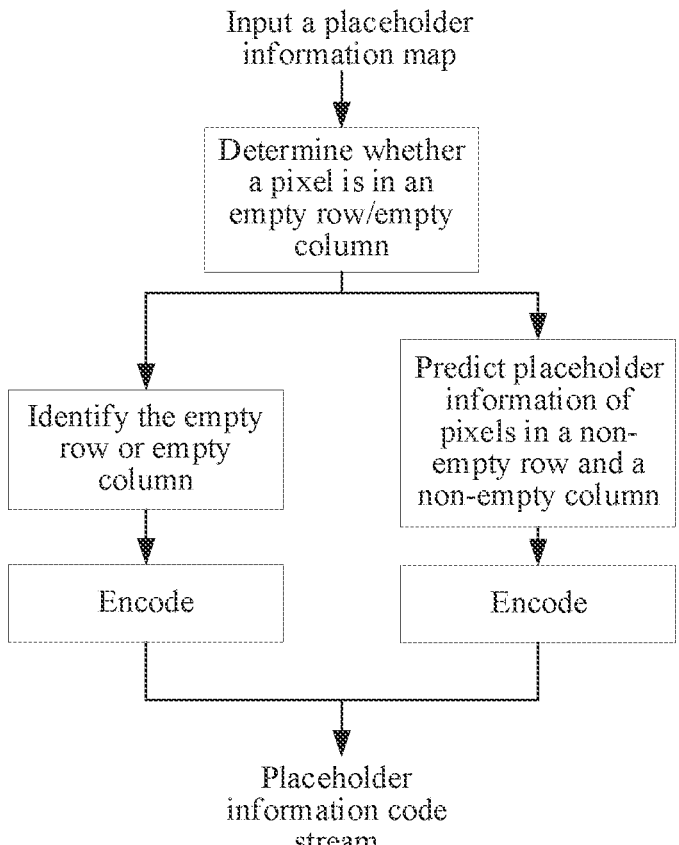
FIG. 6 is another encoding block diagram of a placeholder information map according to an embodiment of the present disclosure.

In addition, in another embodiment of the present disclosure, each pixel in the placeholder information map may alternatively be sequentially determined and encoded in a traversal manner. FIG. 6 is another encoding block diagram of a placeholder information map according to an embodiment of the present disclosure, which specifically includes:

4a) The pixels in the placeholder information map are traversed in a preset scanning order. If it is determined that the current pixel is in an empty row or empty column, and the current pixel is the first element of the row or column, the empty row or empty column is identified, and the identifier is encoded.

Specifically, in this embodiment, the pixels in the placeholder information map may be traversed in a specific scanning order, for example, a Z-shaped scanning manner, and whether the current pixel is in an empty row or empty column is determined. The specific determining method is that: the row and column in which the current pixel is located are separately traversed, and if there is a non-empty pixel, the pixel is not in an empty row or empty column; otherwise, the pixel is in an empty row or empty column. If the current pixel is in an empty row or empty column and is the first element of the row or column, the empty row or empty column may be identified in the foregoing manner, and the identifier may be encoded.

4b) If the current pixel is not in an empty row or empty column, the placeholder information of the current pixel is predicted and encoded.

Specifically, in this embodiment, the placeholder information of a pixel in a non-empty row and a non-empty column may also be predicted and encoded according to the foregoing prediction and encoding methods.

So far, the encoding of the placeholder information map is completed, and a placeholder information code stream is obtained.

In this embodiment, the empty rows and empty columns in the placeholder information map are identified, and only identifiers and the pixels in non-empty rows and non-empty columns are encoded, which reduces the code stream and greatly improves the encoding efficiency.

Further, in this embodiment, a conventional encoding method may alternatively be used, that is, the empty rows and empty columns are not processed, and reconstructed placeholder information of encoded pixels is directly used to predict the placeholder information of the current pixel and perform corresponding encoding.

In another embodiment of the present disclosure, the placeholder information map may alternatively be encoded through image/video compression. Encoding solutions that can be used herein include, but not limited to: JPEG, JPEG2000, HEIF, H.264\AVC, H.265\HEVC, and the like.

According to the present disclosure, a point cloud in a three-dimensional space is projected to a corresponding two-dimensional regularization projection plane structure, and regularization correction is performed on the point cloud in a vertical direction and a horizontal direction, to obtain a strong correlation representation of the point cloud on the two-dimensional projection plane structure, so that sparsity in a three-dimensional representation structure is avoided, and the spatial correlation of the point cloud is better reflected; and when the placeholder information map and other two-dimensional image information are encoded subsequently, the spatial correlation of the point cloud can be greatly utilized, and the spatial redundancy is reduced, thereby further improving the encoding efficiency of the point cloud.

Embodiment 2

In this embodiment, the plurality of pieces of two-dimensional image information obtained according to the two-dimensional projection plane structure further include at least one of a depth information map, a projection residual information map, and a coordinate conversion error information map.

The depth information map is used to represent a distance between a corresponding point of each occupied pixel in the two-dimensional regularization projection plane structure and a coordinate origin. For example, the cylindrical coordinate component r of the point corresponding to the pixel may be used as a depth of the pixel. Based on this, each occupied pixel in the two-dimensional regularization projection plane structure has a depth value, so that a corresponding depth information map is obtained.

The projection residual information map is used to represent a residual between a corresponding position and an actual projection position of each occupied pixel in the two-dimensional regularization projection plane structure. Based on this, each occupied pixel in the two-dimensional regularization projection plane has a projection residual, so that a projection residual information map corresponding to the point cloud is obtained.

The coordinate conversion error information map is used to represent a residual between a spatial position obtained through inverse projection of each occupied pixel in the two-dimensional regularization projection plane structure and a spatial position of an original point corresponding to the pixel. Based on this, each occupied pixel in the two-dimensional regularization projection plane structure has a coordinate conversion error, so that a coordinate conversion error information map corresponding to the point cloud is obtained.

Correspondingly, the depth information map, the projection residual information map, and the coordinate conversion error information map further need to be encoded according to an actual situation.

Specifically, the four two-dimensional images described above, may be separately encoded in a separate encoding manner, and other information images may also be assisted in encoding sequentially according to the encoded placeholder information map, for example:

The depth information map is traversed in a certain scanning order. For the current pixel in the depth information map, the reconstructed placeholder information map and the reconstructed depth information of the encoded and decoded pixels may be used for predictive encoding. Specifically, the prediction may be performed based on the existing neighbor prediction technology in combination with the placeholder information of neighbor pixels, that is, only neighbor pixels with non-empty placeholder information are used to predict the depth information of the current pixel. The predicted value may be calculated in manners such as weighted averaging. After the corresponding predicted residual is obtained, the existing entropy encoding technology may be used for encoding, to obtain a depth information code stream.

For the projection residual information map and the coordinate conversion error information map, an encoding method similar to that for the foregoing depth information map may be used for encoding, and details are not described again.

Embodiment 3

Figure 7:
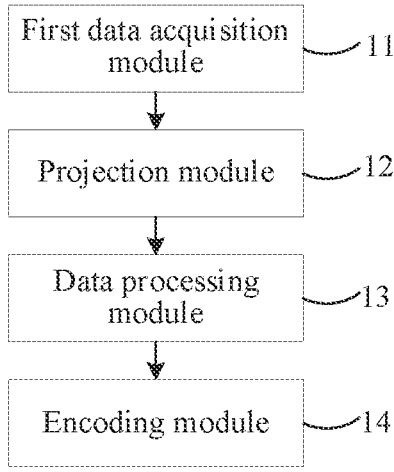
FIG. 7 is a schematic structural diagram of a point cloud encoding device based on a two-dimensional regularization plane projection according to an embodiment of the present disclosure.

Based on Embodiment 1 and Embodiment 2, this embodiment provides a point cloud encoding device based on a two-dimensional regularization plane projection. FIG. 7 is a schematic structural diagram of a point cloud encoding device based on a two-dimensional regularization plane projection according to an embodiment of the present disclosure, which includes:

a first data acquisition module 11, configured to acquire original point cloud data; a projection module 12, configured to perform two-dimensional regularization plane projection on the original point cloud data to obtain a two-dimensional projection plane structure;

a data processing module 13, configured to obtain a plurality of pieces of two-dimensional image information according to the two-dimensional projection plane structure; and an encoding module 14, configured to encode the plurality of pieces of two-dimensional image information to obtain code stream information.

The encoding device provided in this embodiment can implement the encoding method described in Embodiment 1 and Embodiment 2, and the detailed process is not described herein again.

Embodiment 4

Figure 8:
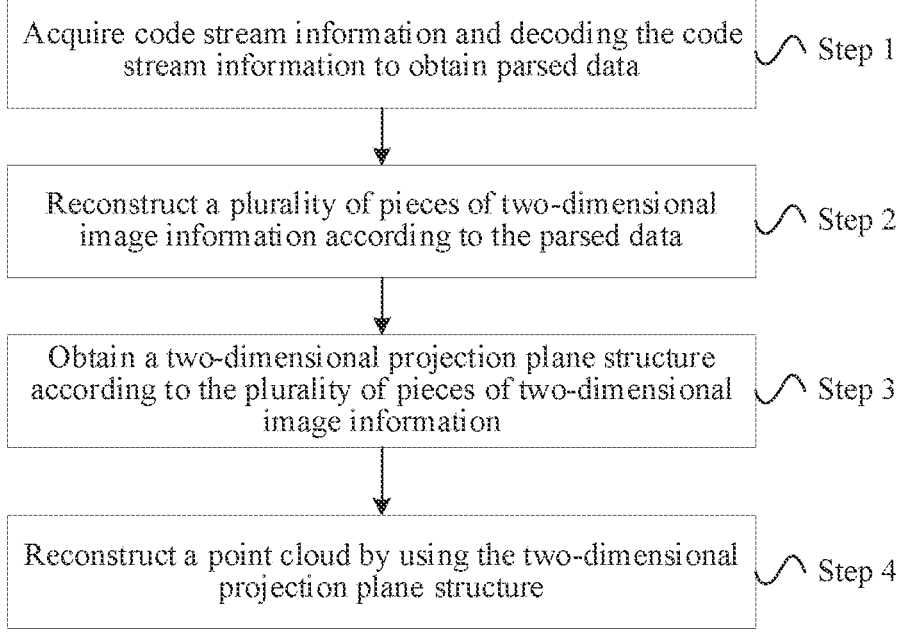
FIG. 8 is a schematic diagram of a point cloud decoding method based on a two-dimensional regularization plane projection according to an embodiment of the present disclosure.

FIG. 8 is a schematic diagram of a point cloud decoding method based on a two-dimensional regularization plane projection according to an embodiment of the present disclosure. The method includes:

Step 1: Acquire code stream information and decoding the code stream information to obtain parsed data.

A decoder side acquires compressed code stream information, and uses a corresponding existing entropy decoding technology to perform corresponding decoding on the code stream information to obtain the parsed data.

Step 2: Reconstruct a plurality of pieces of two-dimensional image information according to the parsed data.

In this embodiment, Step 2 may include the following steps:

directly reconstructing pixels in an empty row or empty column in a placeholder information map according to identifiers of the empty row and the empty column in the placeholder information map in the parsed data, and reconstructing pixels in a non-empty row and a non-empty column in the placeholder information map according to predicted residuals of placeholder information in the parsed data, to obtain a reconstructed placeholder information map.

Specifically, because at the encoder side, the plurality of pieces of two-dimensional image information may include a placeholder information map, that is, the placeholder information map is encoded, the code stream information at the decoder side correspondingly includes a placeholder information code stream.

More specifically, the parsed data obtained by decoding the code stream information includes identifiers of empty rows and empty columns in the placeholder information map and a predicted residual of the placeholder information.

Figure 9:
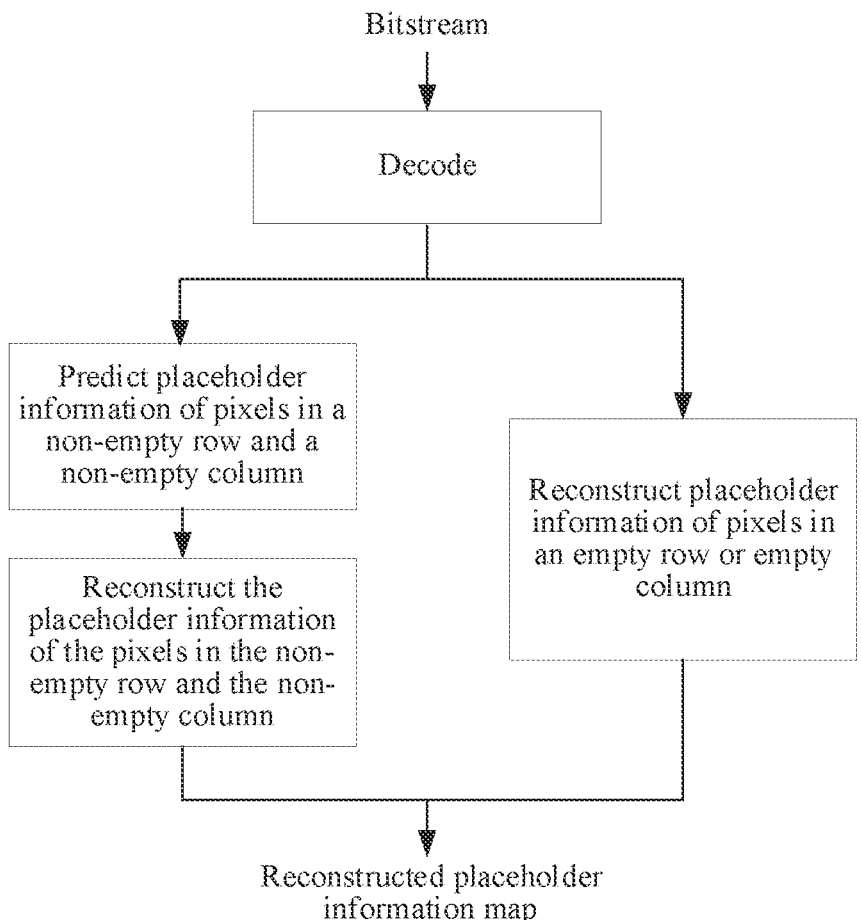
FIG. 9 is a decoding block diagram of a placeholder information map according to an embodiment of the present disclosure.

FIG. 9 is a decoding block diagram of a placeholder information map according to an embodiment of the present disclosure. The following process is performed according to the identifiers of empty rows and empty columns in the placeholder information map obtained by parsing and the predicted residual of the placeholder information.

The placeholder information of the pixels in the non-empty rows and non-empty columns is predicted and reconstructed; and the placeholder information of the pixels in the empty rows or empty columns having been identified is directly reconstructed.

Because the encoder side traverses the pixels in the placeholder information map in a certain scanning order and encodes the placeholder information of pixels in non-empty rows and non-empty columns, predicted residuals of the pixel placeholder information obtained by the decoder side is also in this order, and the decoder side may obtain the resolution of the placeholder information map by using regularization parameters. For details, reference may be made to the part of initializing the two-dimensional projection plane structure in S2 in Embodiment 1. Therefore, the decoder side can know a position of a pixel currently to be reconstructed in the two-dimensional map according to parsed identifiers of empty rows and empty columns and the resolution of the placeholder information map.

On the one hand, for the pixel currently to be reconstructed in the placeholder information map, the reconstructed placeholder information of the encoded and decoded pixels is used for prediction. The prediction method is consistent with that of the encoder side. That is, the reconstructed placeholder information of encoded and decoded neighbor pixels adjacent to the current pixel is used for prediction, and then the placeholder information of the current pixel is reconstructed according to the obtained predicted value and the parsed predicted residual. On the other hand, the placeholder information of pixels in empty rows and empty columns in the placeholder information map is reconstructed according to the parsed identifiers of the empty rows and empty columns. After the placeholder information of all pixels is reconstructed, a reconstructed placeholder information map is obtained.

Step 3: Obtain a two-dimensional projection plane structure according to the two-dimensional image information.

Because the resolution of the two-dimensional projection plane structure is consistent with that of the placeholder information map, and the placeholder information map has been reconstructed, the placeholder information of each pixel in the two-dimensional projection plane structure can be known, to obtain a reconstructed two-dimensional projection plane structure.

Step 4: Reconstruct a point cloud by using the two-dimensional projection plane structure.

Specifically, by traversing the pixels in the reconstructed two-dimensional projection plane structure in a certain scanning order, the placeholder information of each pixel can be known. If placeholder information of the current pixel (i, j) is non-empty, other information such as depth information and coordinate conversion error information is used to reconstruct a space point (x, y, z) corresponding to the pixel. Specifically, the corresponding position of the current pixel (i, j) may be expressed as ($\theta_j$, i), then the regularization parameters and other information such as depth information r and coordinate conversion error information ($\Delta x$, $\Delta y$, $\Delta z$) may be used to reconstruct the space point (x, y, z) corresponding to the current pixel. The specific calculation is as follows:

$$\phi_j = -180° + j \times \Delta\varphi$$

$$\theta_i = \theta_0$$

$$xl = r \cdot \sin(\phi_j - \alpha) - H_o \cdot \cos(\phi_j - \alpha)$$

$$yl = r \cdot \cos(\phi_j - \alpha) + H_o \cdot \sin(\phi_j - \alpha)$$

$$zl = r \cdot \tan\theta_i + V_o$$

$$(x,y,z) = (xl,yl,zl) + (\Delta x, \Delta y, \Delta z)$$

Finally, a corresponding space point can be reconstructed for each non-empty pixel in the two-dimensional projection structure according to the foregoing calculation, to obtain the reconstructed point cloud.

Embodiment 5

Figure 10:
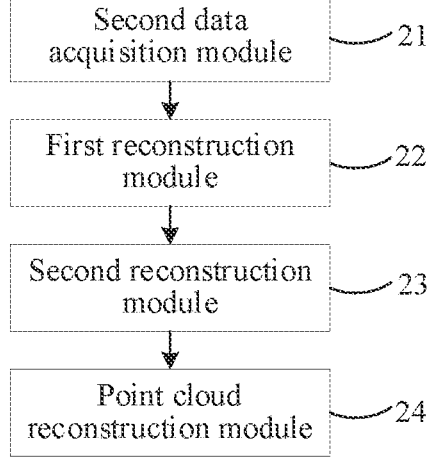
FIG. 10 is a schematic structural diagram of a point cloud decoding device based on a two-dimensional regularization plane projection according to an embodiment of the present disclosure.

Based on Embodiment 4, this embodiment provides a point cloud decoding device based on a two-dimensional regularization plane projection. FIG. 10 is a schematic structural diagram of a point cloud decoding device based on a two-dimensional regularization plane projection according to an embodiment of the present disclosure, which includes:

a second data acquisition module 21, configured to acquire code stream information and decode the code stream information to obtain parsed data;

a first reconstruction module 22, configured to reconstruct a plurality of pieces of two-dimensional image information according to the parsed data;

a second reconstruction module 23, configured to obtain a two-dimensional projection plane structure according to the plurality of pieces of two-dimensional image information; and a point cloud reconstruction module 24, configured to reconstruct a point cloud by using the two-dimensional projection plane structure.

The decoding device provided in this embodiment can implement the decoding method in Embodiment 4, and the detailed process is not described herein again.

The foregoing contents are detailed descriptions of the present disclosure with reference to specific exemplary embodiments, and it should not be considered that the specific implementation of the present disclosure is limited to these descriptions. A person of ordinary skill in the art, to which the present disclosure belongs, may further make several simple deductions or replacements without departing from the concept of the present disclosure, and such deductions or replacements should all be considered as falling within the protection scope of the present disclosure.

What is claimed is:

1. A point cloud encoding method, comprising:
acquiring original point cloud data;
performing two-dimensional regularization plane projection on the original point cloud data to obtain a two-dimensional projection plane structure;
obtaining a plurality of pieces of two-dimensional image information according to the two-dimensional projection plane structure, wherein the plurality of pieces of two-dimensional image information comprises a placeholder information map; and
encoding the plurality of pieces of two-dimensional image information to obtain code stream information, wherein the encoding the plurality of pieces of two-dimensional image information to obtain the code stream information comprises:
encoding the placeholder information map to obtain a placeholder information code stream;
wherein the encoding the placeholder information map to obtain the placeholder information code stream comprises:
identifying an empty row and an empty column in the placeholder information map;
encoding identifiers of the empty row and the empty column in the placeholder information map; and
encoding placeholder information of pixels in a non-empty row and a non-empty column in the placeholder information map to obtain the placeholder information code stream.

2. The point cloud encoding method according to claim 1, wherein the encoding the placeholder information of pixels in the non-empty row and the non-empty column in the placeholder information map comprises:
predicting the placeholder information of the pixels in the non-empty row and the non-empty column by using reconstructed placeholder information of encoded pixels, and performing corresponding encoding.

3. The point cloud encoding method according to claim 1, wherein the plurality of pieces of two-dimensional image information further comprises at least one of a depth information map, a projection residual information map, or a coordinate conversion error information map.

4. An electronic device, comprising:
one or more processors; and
one or more memories coupled to the one or more processors and storing instructions that, when executed by the one or more processors, cause the electronic device to be configured to:
acquire original point cloud data;
perform two-dimensional regularization plane projection on the original point cloud data to obtain a two-dimensional projection plane structure;
obtain a plurality of pieces of two-dimensional image information according to the two-dimensional projection plane structure, wherein the plurality of pieces of two-dimensional image information comprises a placeholder information map; and
encode the plurality of pieces of two-dimensional image information to obtain code stream information, wherein the encoding the plurality of pieces of two-dimensional image information to obtain the code stream information comprises:
encoding the placeholder information map to obtain a placeholder information code stream;

wherein the encoding the placeholder information map to obtain the placeholder information code stream comprises:

identifying an empty row and an empty column in the placeholder information map;

encoding identifiers of the empty row and the empty column in the placeholder information map; and encoding placeholder information of pixels in a non-empty row and a non-empty column in the placeholder information map to obtain the placeholder information code stream.

5. The electronic device according to claim 4, wherein the encoding the placeholder information of pixels in the non-empty row and the non-empty column in the placeholder information map comprises:

predicting the placeholder information of the pixels in the non-empty row and the non-empty column by using reconstructed placeholder information of encoded pixels, and performing corresponding encoding.

6. The electronic device according to claim 4, wherein the plurality of pieces of two-dimensional image information further comprises at least one of a depth information map, a projection residual information map, or a coordinate conversion error information map.

* * * * *